United States Patent [19]

Wärn

[11] 4,281,345
[45] Jul. 28, 1981

[54] SYNCHRONIZATION OF DIGITAL MEMORY WITH TV SIGNAL HAVING INTERLACE

[75] Inventor: Stefan Wärn, Järfälla, Sweden

[73] Assignee: Globe Computers AB, Stockholm, Sweden

[21] Appl. No.: 135,108

[22] Filed: Mar. 28, 1980

[30] Foreign Application Priority Data

Mar. 30, 1979 [SE] Sweden ............................. 7902862

[51] Int. Cl.³ ..................... H04N 5/22; H04N 7/08; H04N 5/04
[52] U.S. Cl. ................................ 358/149; 358/147; 358/183; 358/153
[58] Field of Search ............... 358/148, 149, 142, 147, 358/188, 192.1, 183, 153, 154; 340/721, 750

[56] References Cited

U.S. PATENT DOCUMENTS

| | | |
|---|---|---|
| 3,898,377 | 8/1975 | Fairbairn et al. ..................... 358/148 |
| 3,982,064 | 9/1976 | Barnaby ............................... 358/147 |

Primary Examiner—John C. Martin
Attorney, Agent, or Firm—Burns, Doane, Swecker & Mathis

[57] ABSTRACT

The aim of the present invention is to make it possible to synchronize a digital memory with an existing TV-system, in which a TV-picture is transmitted with video interlace. According to the invention a corrected field synchronizing pulse is formed by means of a composite sync signal of the TV-system, which pulse, in spite of the video interlace, always appears at the starting point of a line and by means of which a part in an address counter for the memory associated with vertical addressing of the memory is reset to a starting position at the starting point of each picture field. The address counter is stepped for addressing purposes by means of a clock signal from a main oscillator, the frequency of which is controlled in response to a comparison between a line synchronizing signal derived from the composite sync signal and line frequency signals supplied from the address counter.

2 Claims, 1 Drawing Figure

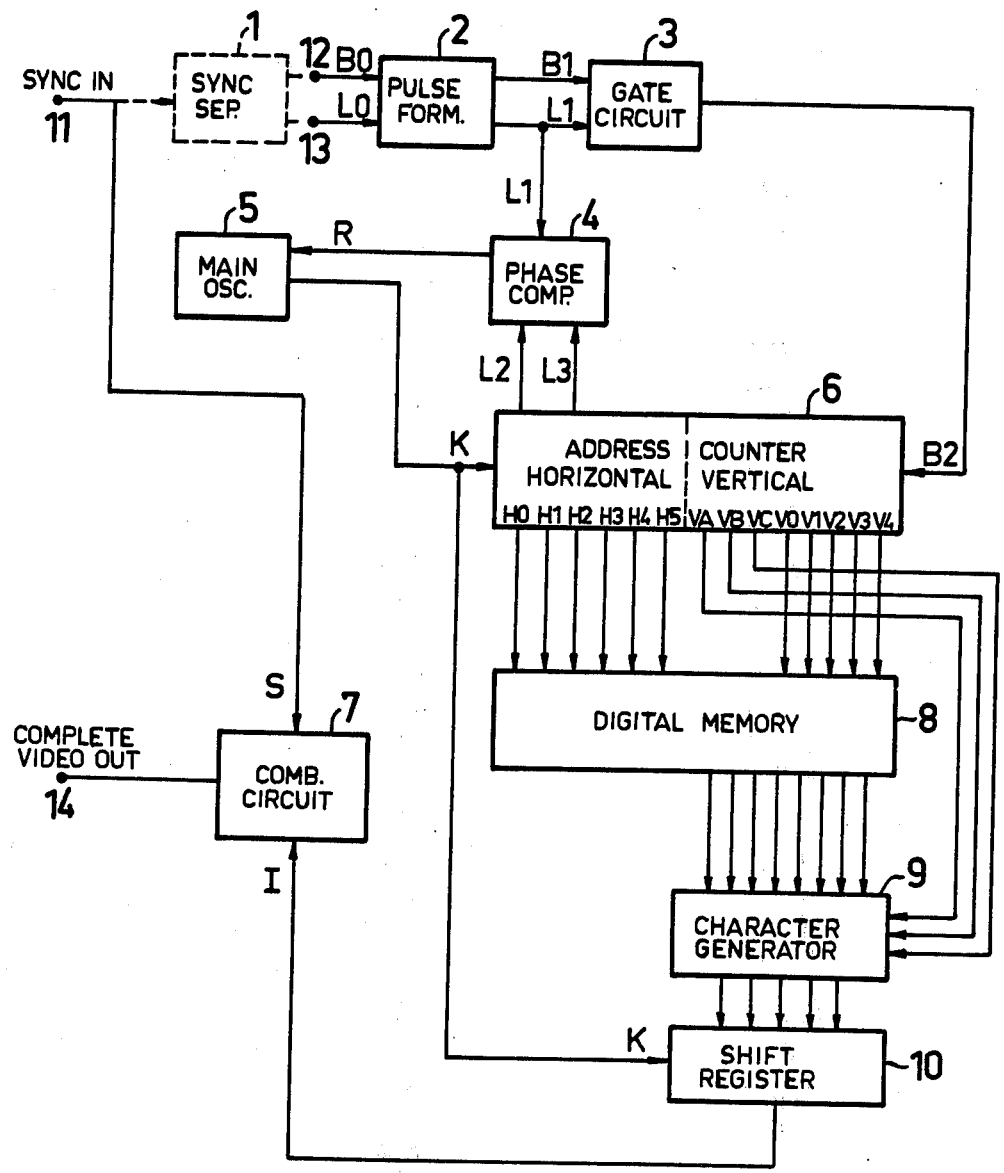

SYNCHRONIZATION OF DIGITAL MEMORY WITH TV SIGNAL HAVING INTERLACE

This invention relates to a method of synchronizing a digital memory, such as a memory arranged in a microprocessor or in a display terminal, with an existing TV-system, in which a TV-picture is transmitted with video interlace, and a device for carrying out this method, according to the preamble of the appended claim 1 and 2, respectively.

When transmitting certain TV-programs, such as live transmitted sports events, the picture is often provided with supplementary, recurring alphanumerical information at definite places in the picture field. This information can e.g. consist of names of the competitors, numerical time information, total number of points etc. According to conventional technique for producing such pictures supplemented with alphanumerical information an extra TV-camera is utilized, which is directed to a viewing screen of a data terminal. On the viewing screen the actual alphanumerical information in question is then generated in the positions corresponding to the desired places in the picture field, and the output signal from the extra TV-camera is then superimposed with the video signal transmitted in the TV-system.

The shortcomings of this conventional technique are rather great. Due to the fact that available terminals are mostly adapted to the US NTSC system the picture will be vertically instable if such a terminal is used in the European PAL system. The loss of video definition arising in the use of an extra TV-camera is also a disadvantage. Moreover, the whole equipment with extra camera and data terminal requires a rather large space, as the camera and the viewing screen must be fixed relative to each other at a constant distance. Finally, this type of device represents a not inessential cost, especially in the case when advanced graphic possibilities are desired for the display terminal.

It is the object of the present invention to provide a method for synchronizing a digital memory with an existing TV-system, by which it is possible to feed an output signal from the output of the memory. TV-system for superimposing with the video signal transmitted in the TV-system. Thereby, the extra TV-camera and the viewing screen required in conventional technique will be eliminated and thus also the disadvantages associated therewith.

Another object of the present invention is to provide a device for carrying out this method.

The above-mentioned objects are achieved by the method and the device of the invention being provided with the characteristic features indicated in claim 1 and 2, respectively.

The method of the invention consists of the following steps:

(a) forming and time adjusting field and line synchronizing pulses separated from a composite sync signal of the TV-system;

(b) gating the formed and time adjusted field and line synchronizing pulses in order to generate a corrected field synchronizing pulse, which, in spite of the video interlace, always appears at the starting point of a line;

(c) supplying the corrected field synchronizing pulse to an address counter for the digital memory in order to reset, at the starting point of a picture field, the part of the address counter, which is associated with the vertical addressing of the memory to a starting position;

(d) comparing the phase position between the formed and time adjusted line synchronizing pulses and line frequency pulses supplied from the address counter for producing a voltage for correcting the frequency of a main oscillator utilized for clock control of the address counter; and (e) combining the composite sync signal of the TV-system with an information signal read from the digital memory by means of the address counter for generating a video signal according to the standards of the TV-system.

The invention will be described more in detail in the following with reference to the enclosed drawing showing a block diagram of a circuit arrangement according to the invention.

Via a terminal 11 of the circuit arrangement a composite sync signal S of an existing TV-system is supplied to a first input of a combination circuit 7 and optionally to a sync separator 1 (marked as a dashed box), where the field and the line synchronizing pulses are separated from each other by utilizing their detected difference in length. Alternatively field synchronizing pulses and line synchronizing pulses already separated in the TV-system can be directly supplied to terminals 12 and 13 of the circuit arrangement, in which case the sync separator 1 can be dispensed with.

The field synchronizing pulses BO and the line synchronizing pulses LO emitted from the sync separator 1 or directly supplied from the TV-system to the terminals 12 and 13, which first pulses in the PAL-system appear at a frequency of 50 Hz (field frequency) and which second pulses in the PAL-system appear at a frequency of 15625 Hz (line frequency), are each supplied to a respective input of a pulse forming circuit 2. As the picture is transmitted with video interlace in the existing TV-system each second field synchronizing pulse appears between two line synchronizing pulses instead of simultaneously with a line synchronizing pulse. In order to obtain a correct synchronization of the address counter 6 described below, a field synchronizing signal must be generated which always appears simultaneously with a line synchronizing signal. For this purpose the signals BO and LO at first are formed an time adjusted in the pulse forming circuit 2 in order to obtain appropriate lengths, e.g. 5.2 $\mu$s for the line synchronizing pulse and 48 $\mu$s for the field synchronizing pulse. These lengths are constant even if the input signals vary. The pulse forming circuit 2 preferably consists of two monostable circuits from which the formed and time adjusted field and line synchronizing pulses B1 and L1, respectively, are supplied to a logic gate circuit 3. In the gate circuit 3 an AND-gating of the input signals B1 and L1 is performed so that an output signal B2 is only emitted when the two signals B1 and L1 are simultaneously present, i.e. so that a corrected field synchronizing pulse B2 is obtained which always appears at the start of a line in spite of the video interlace.

The corrected field synchronizing pulse B2 is supplied to the address counter 6, which comprises a first part for horizontal addressing of a digital memory 8 and a second part for vertical addressing of said memory 8. By means of the corrected field synchronizing pulse B2 the second part of the address counter 6 is reset to the starting position at the starting point of a picture field. The address counter 6, e.g. consisting of flip-flops, is stepped for addressing purposes by means of a clock signal K from a main oscillator 5 for the overall circuit arrangement. The frequency of the main oscillator 5 is controlled by means of a signal R from a phase comparator 4, comparing the phase position between the formed and time adjusted line synchronizing pulses L1 and line-frequency pulses L2 and L3 (15625 Hz and 31250 Hz, respectively) supplied from the address counter 6. In case of a phase error the phase comparator 4 generates a voltage adjusting the main oscillator 5 to the correct frequency so that the phase error is eliminated. The main oscillator 5 can consist of a crystal oscillator or some other stable oscillator, the frequency of which can be varied to such an extent that a sufficient locking range for the phase locked loop is obtained.

The digital memory 8, which e.g. can be a memory included in a microprocessor or a display terminal, in which case the main oscillator and the address counter of the microprocessor or the display terminal naturally can be utilized as the main oscillator 5 and the address counter 6, is horizontally addressed via the outputs H0 to H5 of the address counter and vertically addressed via the outputs V0 to V4 of the address counter. Thereby the address counter 6, as already mentioned above, is synchronized with the existing TV-system in such a way that its second part used for vertical addressing of the memory 8 is reset to the starting position at the starting point of each picture field (field synchronization), and the frequency of the clock signal K derived from the main oscillator 5 is phase locked to the line synchronizing signal (line synchronization).

The information stored in the digital memory 8 at the relative address supplied from the address counter 6 is read from the memory in the form of a character code, which is supplied in parallel form to a character generator 9. A complete alphanumerical character, which is later to be displayed on a TV-screen, is formed according to known technique by dots in a character raster consisting of 5×8 points. Thus, the character generator 9 in response to the supplied character code successively emits signals corresponding to 5 horizontal points in the character raster, the 8 addresses of a line within one character being obtained from outputs VA, VB, VC on the second part of the address counter 6 utilized for vertical addressing. The character information emitted in parallel form from the character generator 9 is fed into a shift register 10 clocked from the main oscillator 5.

The actual character information I is supplied from the shift register 10 in serial form to a second input on the combination circuit 7, where it is combined with the composite sync signal S of the TV-system for generation of a video signal according to the standards of the TV-system on the output terminal 14 of the circuit arrangement.

What I claim is:

1. A method for synchronizing a digital memory, such as a memory arranged in a microprocessor or in a display terminal, with an existing TV-system in which a TV-picture is transmitted with video interlace, characterized by the following steps:
   (a) forming and time adjusting field and line synchronizing pulses separated from a composite sync signal of the TV-system;
   (b) gating the formed and time adjusted field and line synchronizing pulses in order to generate a corrected field synchronizing pulse, which, in spite of the video interlace, always appears at the starting point of a line;
   (c) supplying the corrected field synchronizing pulse to an address counter for the digital memory in order to reset, at the starting point of a picture field, the part of the address counter, which is associated with the vertical addressing of the memory to a starting position;
   (d) comparing the phase position between the formed and time adjusted line synchronizing pulses and line frequency pulses supplied from the address counter for producing a voltage for correcting the frequency of a main oscillator utilized for clock control of the address counter; and
   (e) combining the composite sync signal of the TV-system with an information signal read from the digital memory by means of the address counter for generating a video signal according to the standards of the TV-system.

2. A device for carrying out the method of claim 1 for synchronizing a digital memory such as a memory arranged in a microprocessor or in a display terminal, with an existing TV-sytem, in which a TV-picture is transmitted with video interlace, characterized by
   (a) a pulse forming circuit arranged to form and time adjust field and line synchronizing pulses separated from a composite sync signal of the TV-system;
   (b) a logic gate circuit connected to the pulse forming circuit and responsive to the field and the line synchronizing pulses formed and time adjusted in the pulse forming circuit, for generating a corrected field synchronizing pulse, always appearing, in spite of the video interlace, at the starting point of a line;
   (c) an address counter associated with the digital memory comprising a first part for horizontal addressing of the memory and a second part for vertical addressing of the memory, the second part of the address counter being reset to the starting position at the starting point of a picture field by means of the corrected field synchronizing pulse from the logic gate circuit;
   (d) a phase comparator connected to the pulse forming circuit and the address counter, which comparator is arranged to compare the phase position between the formed and time adjusted line synchronizing pulses and line frequency pulses supplied from the address counter and which in response to this comparison is arranged to generate a voltage for correcting the frequency of a main oscillator utilized for clock control of the address counter; and
   (e) a combination circuit connected to the digital memory, which circuit is arranged to combine the composite sync signal of the TV-system with an information signal read from the memory by means of the address counter so that a video signal according to the standards of the TV-system is obtained.

* * * * *